US009242764B2

(12) United States Patent
Zetterlund (10) Patent No.: US 9,242,764 B2
(45) Date of Patent: Jan. 26, 2016

(54) TRANSPORTATION BOX FOR TECHNICAL EQUIPMENT
(71) Applicant: TACTIQA TECHNOLOGY AB, Sundbyberg (SE)
(72) Inventor: Bo Rikard Zetterlund, Copenhagen (DK)
(73) Assignee: TACTIQA TECHNOLOGY AB, Sundbyberg (SE)
( * ) Notice: Subject to any disclaimer, the term of this patent is extended or adjusted under 35 U.S.C. 154(b) by 0 days.
(21) Appl. No.: 14/423,932
(22) PCT Filed: Aug. 22, 2013
(86) PCT No.: PCT/DK2013/050269
§ 371 (c)(1),
(2) Date: Feb. 25, 2015
(87) PCT Pub. No.: WO2014/032675
PCT Pub. Date: Mar. 6, 2014
(65) Prior Publication Data
US 2015/0225123 A1 Aug. 13, 2015
(30) Foreign Application Priority Data

Aug. 29, 2012 (DK) ................................ 2012 00527

(51) Int. Cl.
*B65D 25/24* (2006.01)
*F16M 11/28* (2006.01)
(Continued)
(52) U.S. Cl.
CPC ................ *B65D 25/24* (2013.01); *B65D 85/68* (2013.01); *B65D 85/70* (2013.01); *F16M 11/28* (2013.01);
(Continued)
(58) Field of Classification Search
USPC ............ 220/4.02, 4.28, 6, 7; 206/45.2, 45.24, 206/45.25, 45.26, 546, 569, 576
See application file for complete search history.

(56) References Cited

U.S. PATENT DOCUMENTS 3,960,352 A * 6/1976 Plattner .................. F16M 13/00
248/188

4,365,576 A * 12/1982 Cook ...................... B63B 35/44
114/257

(Continued)

FOREIGN PATENT DOCUMENTS

JP S59-73696 5/1984
WO WO 02/44503 6/2002

OTHER PUBLICATIONS

International Search Report on corresponding PCT application (PCT/DK2013/050269) from International Searching Authority (EPO) dated Jan. 16, 2014.

*Primary Examiner* — Jacob K Ackun
(74) *Attorney, Agent, or Firm* — Klein, O'Neill & Singh, LLP (57) ABSTRACT

The present invention relates to a transportation box 100 for technical equipment 200, said transportation box in the orientation intended for use comprising: —a first, upper end frame 8, said first end frame having a hexagonal circumference and comprising six vertices 1,2,3,4,5,6 and six edges 11,12,13,14,15,16; —a second, lower end frame 18, said second end frame having a hexagonal circumference and comprising six vertices 21,22,23,24,25,26 and six edges 31,32,33,34,35,36; —said first and said second end frames being connected by six longitudinal corner elements 41,42, 43,44,45,46; —each said corner element extending from one vertex of said first end frame 8 to one vertex of said second end frame 18; —said transportation box thereby comprising six longitudinal side sections 51,52,53,54,55,56; —wherein three of said six longitudinal side sections are leg sections 51,53,55, each leg section comprising a leg assembly 60; —wherein each leg assembly 60 comprises an extendable leg 70 being adapted to be able to switch between a collapsed state, in which the leg is accommodated in said corresponding leg section 51,53,55; and an extended state, in which said leg is extending outward from said leg section 51,53,55 to provide support for said transportation box when arranged in an upright position; —wherein each said leg assembly 60 comprises locking means 110 for releasable locking its corresponding leg in its extended state; —wherein any two of said three leg sections 51,53,55 are arranged on either side of a side section which is not a leg section 52,54,56.

16 Claims, 7 Drawing Sheets

(51) Int. Cl.
*F16M 11/38* (2006.01)
*F16M 13/02* (2006.01)
*H04R 1/02* (2006.01)
*B65D 85/68* (2006.01)
*B65D 85/00* (2006.01)
*F21V 17/00* (2006.01)
*F21V 21/14* (2006.01)
*H02G 3/04* (2006.01)

(52) U.S. Cl.
CPC ............. *F16M 11/38* (2013.01); *F16M 13/022* (2013.01); *H04R 1/026* (2013.01); *B65D 2585/6877* (2013.01); *B65D 2585/86* (2013.01); *F21V 17/007* (2013.01); *F21V 21/14* (2013.01); *H02G 3/0493* (2013.01)

(56) References Cited

U.S. PATENT DOCUMENTS

| | | | |
|---|---|---|---|
| 6,857,711 B1 * | 2/2005 | Straus | A47B 45/00 312/205 |
| 8,684,552 B2 * | 4/2014 | de Blois | A47B 13/023 312/140.1 |
| 9,016,485 B1 * | 4/2015 | Liu | A47B 47/0075 211/183 |
| 2005/0117340 A1 | 6/2005 | Lee et al. | |
| 2009/0071922 A1 | 3/2009 | Barra | |
| 2011/0094908 A1 * | 4/2011 | Trieu | A45C 11/38 206/316.2 |

* cited by examiner

TRANSPORTATION BOX FOR TECHNICAL EQUIPMENT

CROSS-REFERENCE TO RELATED APPLICATION

This application is the National Phase, under 35 U.S.C. §371(c), of International Application No. PCT/DK2013/050269, filed Aug. 22, 2013, the disclosure of which is incorporated herein by reference in its entirety.

FIELD OF THE PRESENT INVENTION

The present invention relates in a first aspect to a transportation box for technical equipment. In a second aspect the present invention relates to a method of manufacturing the transportation box according to the first aspect. In a third aspect the present invention relates to the use of the transportation box according to the first aspect.

BACKGROUND OF THE PRESENT INVENTION

In various situations in which technical equipment is needed, it is preferred to transport that equipment in transportation boxes for easy movement or transport of the technical equipment and for protection of the equipment which may be delicate and fragile.

This in not least the case in situations where the technical equipment is equipment for use in emergency settings, such as technical equipment for providing light, technical equipment for providing information to the public in the form of visual information printed on posters or displayed on e.g. a LED screen, technical equipment for providing acoustic information, such as in the form of a human voice by means of a loudspeaker and an amplifier.

In such an emergency situation it is of paramount importance that the technical equipment can be transported safe and easy to the site of the emergency and it is of paramount importance that the equipment can be set up easily and quickly.

In certain situations it will also be of paramount importance that the technical equipment can be raised over the ground to a certain height for easing the mediation of the information provided by that technical equipment to a large group of people.

US 2009/0095762 A1 discloses a storage container having a retractable stand which may be folded down to raise the container for increased convenience. The container described in US 2009/0095762 A1 is not suitable for use as an equipment for providing light or for mediating information to the public because the interior of the container does not allow to be exposed in a horizontal direction which means that the equipment for providing light or for mediating information to the public must be removed from the interior in order to provide the desired effect.

IL 74888 A discloses a foldable stand for lighting fixtures. However, the lighting stand of this publication does not comprise a protective casing for the lighting equipment in itself.

Hence, there exists a continued need for a transportation box for technical equipment which provides protection for that equipment and at the same time allows preparation of that equipment for use in a fast and safe way.

SUMMARY

This need is fulfilled according to the present invention which in a first aspect relates to a transportation box 100 for technical equipment 200, said transportation box in the orientation intended for use comprising:

a first upper end frame 8, said first end frame having a hexagonal circumference and comprising six vertices 1,2,3,4,5,6 and six edges 11,12,13,14,15,16;

a second lower end frame 18, said second end frame having a hexagonal circumference and comprising six vertices 21,22,23,24,25,26 and six edges 31,32,33,34,35,36;

said first and said second end frames being connected by six longitudinal corner elements 41,42,43,44,45,46;

each said corner element extending from one vertex of said first end frame 8 to one vertex of said second end frame 18;

said transportation box thereby comprising six longitudinal side sections 51,52,53,54,55,56;

wherein three of said six longitudinal side sections are leg sections 51,53,55, each leg section comprising a leg assembly 60;

wherein each leg assembly 60 comprises an extendable leg 70 being adapted to be able switch between a collapsed state, in which the leg is accommodated in said corresponding leg section 51,53,55; and an extended state, in which said leg is extending outward from said leg section 51,53,55 to provide support for said transportation box when arranged in an upright position;

wherein each said leg assembly 60 comprises locking means 110 for releasable locking its corresponding leg in its extended state;

wherein any two of said three leg sections 51,53,55 are arranged on either side of a side section which is not a leg section 52,54,56.

In a second aspect, the present invention relates to a method of production of a transportation box 100 according to the first aspect of the present invention comprising the steps of:

providing individual elements making up said transportation box;

assembling said individual elements so as to obtain said transportation box.

In a third aspect, the present invention relates to the use of a transportation box according to the first aspect in a recreational situation; in an emergency situation; in a professional working situation; in a law and order reinforcement situation, such as a governmental law and order reinforcement situation or a law and order reinforcement situation involving regional or local authorities; or in a military situation.

The transportation box according to the first aspect of the present invention is highly versatile. It provides for accommodation of technical equipment, such as lighting means; loudspeakers; means for receiving or transmission of electromagnetic radiation, such as antennas or parabolic dishes etc.

Furthermore, it provides a fast and easy preparation of such equipment for use, such as in for example in a recreational situation; in an emergency situation; in a professional working situation; or in a governmental law and order reinforcement situation.

Finally, the transportation box according to the first aspect of the present invention does not take up much space when not in use, and therefore the transportation box is easy to store and ship.

BRIEF DESCRIPTION OF THE DRAWINGS

The present invention will become more fully understood form the detailed description given below. The accompanying drawings are given by way of illustration only, and are not limiting of the invention in any way. In the accompanying drawings.

DETAILED DESCRIPTION OF THE PRESENT INVENTION

The Present Invention According to a First Aspect

As mentioned above, the present invention in a first aspect relates to a transportation box 100 for technical equipment 200, said transportation box in the orientation intended for use comprising:
- a first upper end frame 8, said first end frame having a hexagonal circumference and comprising six vertices 1,2,3,4,5,6 and six edges 11,12,13,14,15,16;
- a second lower end frame 18, said second end frame having a hexagonal circumference and comprising six vertices 21,22,23,24,25,26 and six edges 31,32,33,34,35,36;
- said first and said second end frames being connected by six longitudinal corner elements 41,42,43,44,45,46;
- each said corner element extending from one vertex of said first end frame 8 to one vertex of said second end frame 18;
- said transportation box thereby comprising six longitudinal side sections 51,52,53,54,55,56;
- wherein three of said six longitudinal side sections are leg sections 51,53,55, each leg section comprising a leg assembly 60;
- wherein each leg assembly 60 comprises an extendable leg 70 being adapted to be able to switch between a collapsed state, in which the leg is accommodated in said corresponding leg section 51,53,55; and an extended state, in which said leg is extending outward from said leg section 51,53,55 to provide support for said transportation box when arranged in an upright position;
- wherein each said leg assembly 60 comprises locking means 110 for releasable locking its corresponding leg in its extended state;
- wherein any two of said three leg sections 51,53,55 are arranged on either side of a side section which is not a leg section 52,54,56.

The transportation is suitable for transportation of technical equipment, such as lighting equipment or equipment for providing information to the public, such as loadspeakers or LCD screen for e.g. emergency situations.

The transportation box according to the first aspect according comprises an upper and a lower hexagonal end frame connected vertex-by-vertex to each other by six longitudinal corner elements. This way the transportation box comprises six longitudinal side sections, of which every second side section, i.e. three side sections are leg sections each comprising a leg assembly.

The end sections 8,18 may be of regular hexagonal shape in which every edge having the same dimension, or it may be of an irregular hexagonal shape, in which some sides 11,13,15 or 31,33,35 are longer or shorter than the other sides 12,14,16 or 32,34,36, respectively.

Each leg assembly 60 comprises an extendable leg 70. The extendable leg being adapted to be able to switch between a collapsed state, in which the leg is accommodated in said corresponding leg section 51,53,55; and an extended state, in which said leg is extending outward from said leg section 51,53,55.

This feature implies that in the transportation box according to the first aspect of the present invention in its collapsed state, every second side section function as accommodation for an extendable leg. The technical equipment carried within the interior of the transportation box, such as lighting means, will be easily and fast prepared for use, simply by changing the state of one or more of the three legs from a collapsed state to an expanded state. If all three legs are brought into their respective expanded states the transportation box will comprise a stand carrying the technical equipment in an upright orientation.

In the present description and in the appended claims, the term "in the orientation intended for use" shall be interpreted as being the orientation in which the six longitudinal corner element are essentially vertically oriented and such that in case the legs are brought to the expanded state, the legs expand from the lower part of the box.

In one embodiment of the first aspect of the present invention, each said leg assembly comprises locking means for releasable locking said leg in its collapsed state.

This feature will be advantageous because it secures that during transport, no legs are allowed to change its position from a collapsed state to an expanded state. Hence, the technical equipment will remain protected by the integrity of the six longitudinal side sections.

In one embodiment of the first aspect of the present invention each said leg assembly comprises:
- said leg 70, being at its one end pivotally attached to the leg section 51,53,55 corresponding to said leg assembly at a position proximate to said second end frame 18, such as at the second end frame 18 corresponding to said leg assembly 60;
- a support strut 72 having two ends; a first end 74 being pivotally attached to said leg 70; and a second end 76 being slidable attached to the leg section 51,53,55.

Such a leg assembly has proven easy and cost-efficient to manufacture. Furthermore, such a design is sturdy in use and the corresponding leg is easy to bring from a collapsed state to an expanded state and vice-versa.

The term "proximate to said second end frame" shall in the present description and in the appended claims be understood to mean that the position at which the said leg is pivotally attached to the leg section is a position corresponding to the lower 30% of the longitudinal extension of said leg section.

In one embodiment of the first aspect of the present invention the locking means 110 of the leg assembly comprising:
a locking element 112 having a first end 114 and a second end 116;
a locking plate 118 being arranged at said leg section 51,53,55 and being adapted to engage with said first end 114 of said locking element 112 so as to form a locking of said leg 70;

said locking element 112 being pivotally mounted on said second end 76 of said support strut 72 at a position between said first end 114 and said second end 116 of said locking element 112;

a safety pin 120;

said safety pin being adapted to be switched between a locking position in which said safety pin prevents un-engagement of said locking element 112 with said locking plate 118 by engaging said locking pin with said second end 116 of said locking element 112; and an unlocking position in which said safety pin allows un-engagement of said locking element 112 with said locking plate 118.

This type of locking means has proven fail-safe. Its function is intuitive and easy to comprehend by an unskilled user. Further, this design is easy and cost-efficient to manufacture.

In one embodiment of the first aspect of the present invention, the safety pin 120 is spring loaded so as to hold it in place in its locking position or in its unlocking position.

Such a design has proven beneficial for its simplicity.

In respect of each leg assembly 60, the angle between said corresponding side section 51,52,53,54,55,56 and said leg 70 in its expanded and locked state is in one embodiment of the first aspect of the present invention 90-175°, such as 95-170°, for example 100-165°, e.g. 105-160°, such as 110-155°, for example 115-150°, such as 120-145°, for example 125-140°, such as 130-135°.

These angles secure that the legs are extending perpendicular to the longitudinal direction of the transportation box of the present invention, or extending downwards from the body of the transportation box, thus providing excellent support to the transportation box in its upright position.

In one embodiment of the first aspect of the present invention the transportation box comprises one or more technical equipment 200.

In one embodiment of the first aspect of the present invention, the one or more technical equipment is selected from the group comprising: lighting means; loudspeakers; means for receiving or transmission of electromagnetic radiation, such as antennas or parabolic dishes, water purification devices, electrical generators, such as a diesel generator, solar cells, or a fuel cell stack.

In one embodiment of the first aspect of the present invention, the transportation box furthermore comprises means for supplying electrical energy to said technical equipment.

In one embodiment of the first aspect of the present invention said means 90 for supplying electrical energy is selected from the group comprising: a battery, an accumulator, a generator coupled to a combustion engine, such as a petrol or a diesel engine, a fuel cell stack.

In one embodiment of the first aspect of the present invention, the number of equipment is 1, 2, 3, 4, 5 or 6.

In one embodiment of the first aspect of the present invention the number of technical equipment is two or more and wherein said two or more technical equipment being essentially identical.

Seeing that the use of the transportation box according to the present invention is extremely versatile, it is preferred to equip said box with more than one item of technical equipment. Such equipment may be three loudspeakers arranged to direct sound in three different directions, each direction being angle approximately 120° relative to the other directions. Alternatively, the box may be equipped with three lighting means arranged to direct its light in three different directions, each direction being angle approximately 120° relative to the other directions.

Further, it is possible to equip the transportation box with different equipment, such as Information providing LED or LCD screens together with a loudspeaker system or with water purification facilities, electrical generators, such as a diesel generator, solar cells, or a fuel cell stack.

By integrating means 90 for supplying electrical energy to said technical equipment, the set-up of the transportation box to a state prepared for use will be extremely quick and easy, which may be very beneficial, e.g. in emergency situations.

In one embodiment of the first aspect of the present invention the transportation box comprises a telescopic pole 130 having a first end 132 connected to said one or more technical equipment, or adapted to be connected to said one or more technical equipment; and a second end 134 attached to said second end frame 18, thereby allowing raising the position of said one or more technical equipment.

Such an embodiment may secure that the information provided by a technical equipment of said transportation box may reach a larger number of people because the technical equipment thereby is raised further from the ground.

In one embodiment of this embodiment said transportation box comprises two or more items of technical equipment and furthermore comprising an unfolding device 136 for folding out said two or more items of technical equipment; wherein said first end 132 of said telescopic pole being connected to a support plate 138 for supporting said two or more technical equipment;

said unfolding device 136 comprising a rod 140 having a first end 142 and a second end 144;

said first end 142 of said rod 140 being connected to said support plate 138;

wherein a hub 146 being slidable attached to said rod 140;

said hub in respect of each of said two or more technical equipment comprises a pivotally connected girder 148;

wherein each of said two or more technical equipment being pivotally connected at a lower end 160 to said support plate 138 of said first end 132 of said telescopic pole 130; and being pivotally connected to said girder 148 at a higher position of said technical equipment 200.

Such an embodiment is especially preferred, in cases, where the transportation box comprises e.g. six lighting devices symmetrically arranged within the transportation box. The unfolding device may secure that the light emitted from such six lighting devices is directed to the ground below, which may be a working place for paramedics or other emergency staff.

This embodiment may also be advantageous when used with only one item of technical equipment.

In one embodiment of this embodiment said transportation box comprises locking means 150 for locking said telescopic pole in a desired position.

The locking means will ensure that once locked, the telescopic pole will not alter its position.

In one embodiment of the first aspect of the present invention the transportation box is having a longitudinal extension from said first end frame 8 to said second end frame 18 of 90-155 cm, such as 95-150 cm, for example 100-145 cm, such as 105-140 cm, e.g. 110-135 cm, such as 115-130 cm, for example 120-125 cm.

In one embodiment of the first aspect of the present invention the transportation box is having a transverse extension from one vertex 1,2,3 or 11,12,13 of said end frame 8,18 to the oppositely arranged vertex 4,5,6 or 14,15,16 of said end frame 8,18 of 25-40 cm, such as 26-39 cm, e.g. 27-38 cm, such as 28-37 cm, for example 29-36 cm, such as 30-35 cm, e.g. 31-34 cm or 32-33 cm.

The above dimensions have proven practical and favorable. In some cases within the above ranges, more of such transportation boxes may neatly be stacked on top of a EUR pallet. Hence, these dimensions provides for easy transportation and storage when not in use.

The Present Invention According to a Second Aspect

The present invention relates in a second aspect to a method of production of a transportation box 100 according to the first aspect, said method comprising the steps of:
providing elements individual elements making up said transportation box;
assembling said individual elements so as to obtain said transportation box.

In one embodiment, said assembling is performed by welding and/or riveting and/or bolting.

The above methods are simple and cost-efficient ways of manufacturing the transportation boxes according to the first aspect.

The Present Invention According to a Third Aspect

The present invention relates in a third aspect to the use of a transportation box according to the first aspect in a recreational situation; in an emergency situation; in a professional working situation; in a law and order reinforcement situation, such as a governmental or a law and order reinforcement situation involving regional or local authorities; or in a military situation.

The use may in one embodiment relate to providing light, providing acoustic signals, such as a voice mediating information to people, providing visual information, such as text displayed on a display screen, such as a TV screen or a monitor, providing water purification facilities, providing electrical generators, such as a diesel generator, solar cells, or a fuel cell stack.

Figure 1:
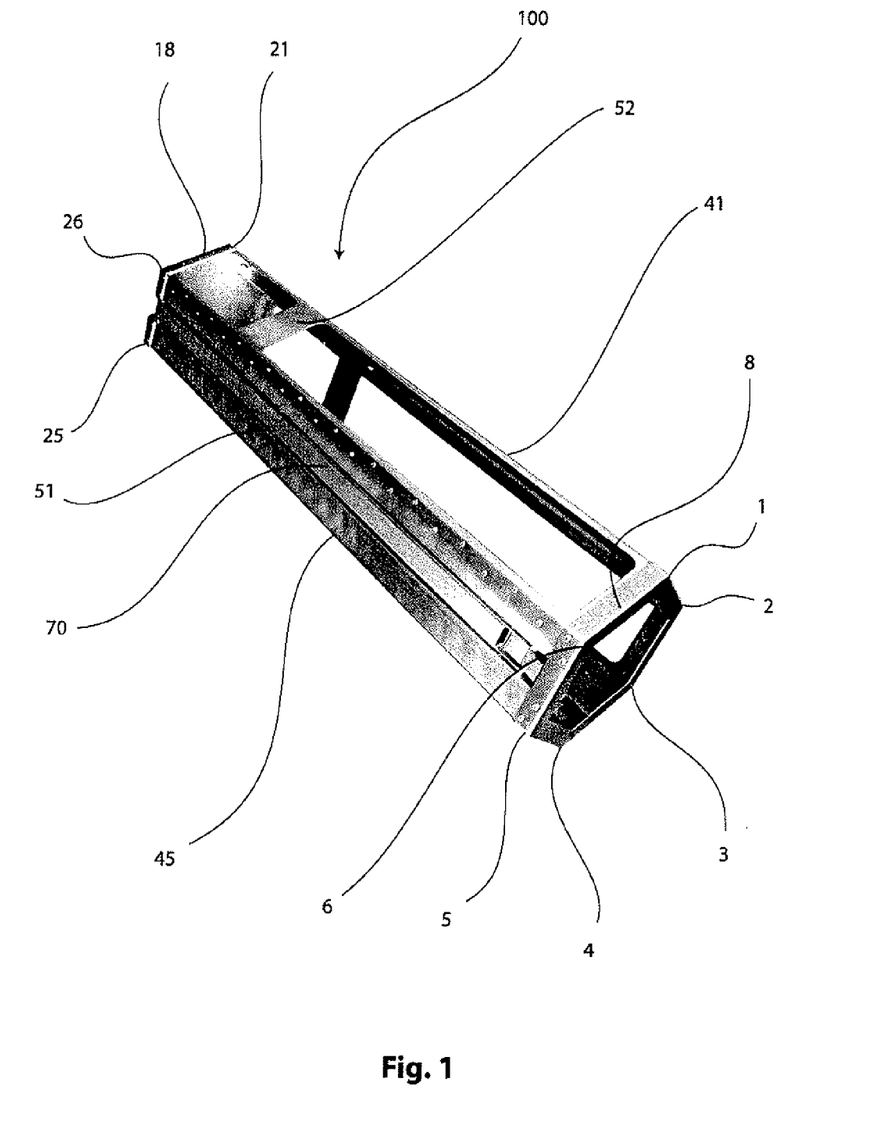
FIG. 1 shows a perspective view of a transportation box according to the first aspect of the present invention.

Referring now in details to the drawings for the purpose of illustrating preferred embodiments of the present invention, a transportation box for technical equipment is illustrated in FIG. 1.

The transportation box 100 illustrated in FIG. 1 is lying down. The transportation box 100 comprises a first end frame 8, a second end frame 18, each having a hexagonal circumference. Each end frame 8,18 comprises six vertices 1,2,3,4,5,6 and 21,22,23,24,25,26 respectively. Likewise, each end frame 8,18 comprises six edges 11,12,13,14,15,16 and 31,32,33,34,35,36 respectively.

Corner elements 41,42,43,44,45,46 extends vertex-to-vertex between the end frames 8,18. The area defined between one edge of the first end frame and the corresponding edge of the second end frame and on the one hand, and between adjacent corner elements on the other hand, defines a longitudinal side section of the transportation box. Hence, the transportation box comprises six longitudinal side sections. Three of these longitudinal side sections 51, 53 and 55 are leg sections.

FIG. 1 shows longitudinal side section 52 and leg section 51. Leg section 51 comprises a leg assembly 60, which in turn comprises an expandable leg 70.

Figure 2:
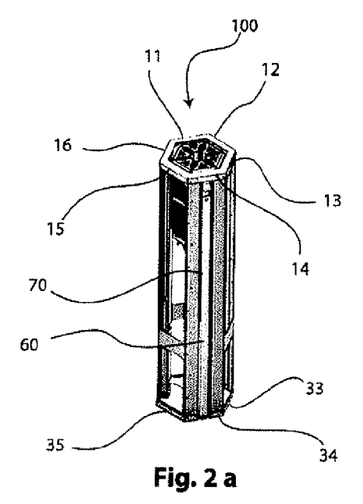
FIGS. 2a-2d shows the process of setting up a transportation box according to the first aspect of the present invention.

FIGS. 2a, 2b, 2c and 2d show the process of preparing the transportation box 100 for use. In FIG. 2a the transportation box has been positioned in an erect orientation in which the longitudinal side sections 51,52,53,54,55,56 essentially are vertically oriented. FIG. 2a shows a leg assembly facing the viewer.

In FIG. 2b the legs of the leg sections 51,53,55 of the transportation box of FIG. 2a are underway of being expanded. FIG. 2b shows that the leg assembly 60 comprises a leg 70 and a support strut 72. The leg 70 is at one end pivotally attached to the leg section at the second end frame 18. The support strut 72 is pivotally attached at one of its ends 74 to said leg 70 approximately midway of the longitudinal extension of said leg. The other end 76 of said support strut 72 is slidably attached to the corresponding side section.

In FIG. 2c the legs 70 of the transportation box 100 are expanded to the degree that they lye parallel to the ground upon which the transportation box is sited.

In FIG. 2d the body of the transportation box has been lifted. This implies that the legs 70 are moving further downward so that the locking means 110 (not shown) for locking the legs have locked the legs 70 in their expanded state.

Figure 3:
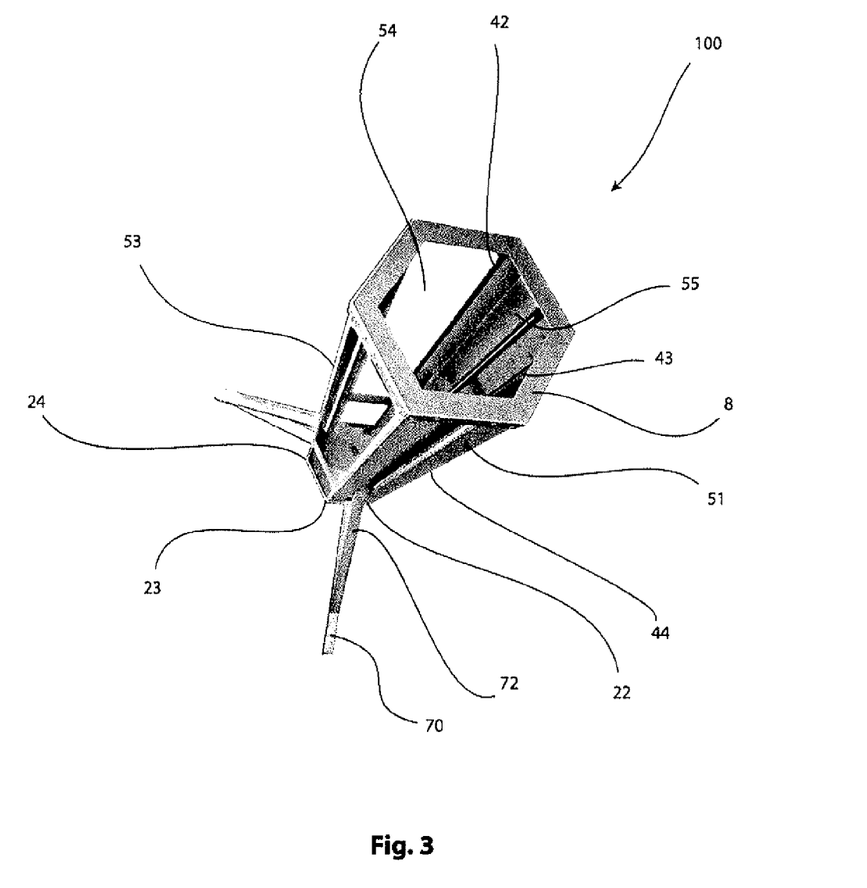
FIG. 3 shows a perspective view seen from above of a transportation box according to the first aspect of the present invention.

FIG. 3 shows the transportation box 100 in its erect state in a perspective view from above. FIG. 3 shows the first end frame 8 connected at its vertices with the second end frame 18 by six corner elements 41,42,43,44,45,46. The corner elements are designed so that three longitudinal side sections 52,54,56 expose the interior of the box 100, whereas other three longitudinal side sections, viz. the leg sections 51,53,55 are fairly closed from the outside.

FIGS. 4a-4d show a preferred locking means 110 for locking the legs 70 in a locked state when the legs are in an expanded position. The locking means 110 comprises a locking element 112 having an upper end 114 and another, lower end 116. The locking element 112 is pivotally attached to the second end 76 of said support strut 72. A locking plate 118 is fastened on the corresponding longitudinal leg section 51. A safety pin 120 is spring loaded to engage in one of two positions, viz. a locking position and an unlocking position.

Figure 4:
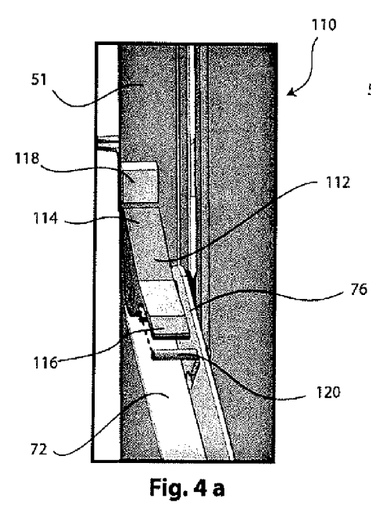
FIGS. 4a-4d illustrate the function of a locking system of a transportation box according to the first aspect of the present invention.

The second end 76 of the support strut 72 may slide up and down in relation to the leg section. In FIG. 4a the second end 76 of the support strut is relatively low. The locking plate 118 is positioned above the locking element 112. The safety pin 120 is in FIG. 2a engaged in its locked position. This means that the locking element 120 is not capable of pivoting. Hence the locking plate 118 ensures that the second end 76 of the support strut is not allowed to slide further upward in relation to the leg section. Hence, the leg 70 is locked in its expanded position.

In FIG. 4b the safety pin has been engaged in its unlocking position. This allows the locking element 112 to pivot. By pivoting the locking element 112, the locking element is capable of sliding further upward, thus passing the locking plate 118. This situation is depicted in FIGS. 4c and 4d.

Figure 5:
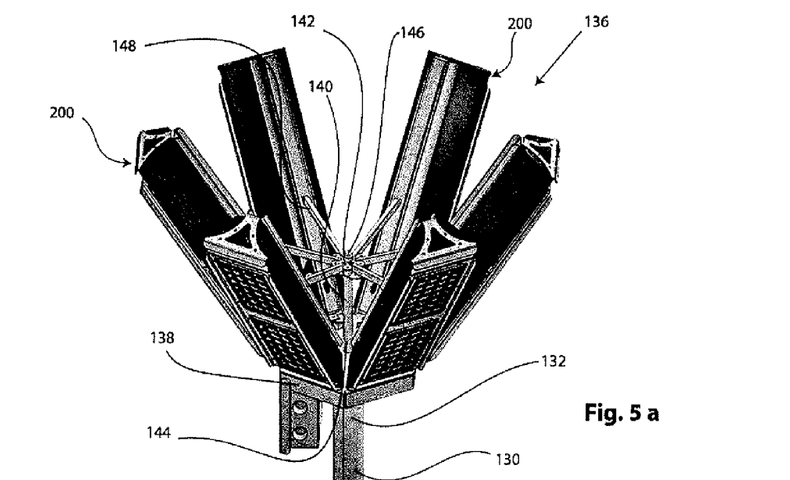
FIGS. 5a-5c illustrate the function of an unfolding device of a transportation box according to the first aspect of the present invention.

FIG. 5a shows a preferred embodiment of the transportation box 100 according to the present invention. The transportation box 100 comprises a telescopic pole 130 which is extendable from the interior of the box in an upward direction.

The telescopic pole 130 comprises a first, upper end 132. On top of the first end of the pole is arranged a support plate 138. The support plate has a hexagonal shape and at its six sides are pivotally attached six items of technical equipment, in this case in the form of lighting means. Each lighting means, besides of being pivotally attached at it lower end, also is pivotally attached to a girder 148 at one end of said girder. The other end of the girder is pivotally attached to a hub, to which the other five corresponding girders, in respect of the other five items of technical equipment, are also attached. The central part of the hub is slidable attached to the rod 140. The rod 140 is at its other end 144 accommodated within the telescopic pole 130.

By sliding the hub 146 up and down, it is possible to angle the technical equipment, in this case in the form of lighting devices to a more or less degree and accordingly adjust the direction of the emitted light.

FIG. 5b shows the unfolding device 136 of the transportation box of FIG. 5a in a partly collapsed state. FIG. 5c shows the unfolding device 136 of the transportation box of FIG. 5a in a fully collapsed state.

Figure 6:
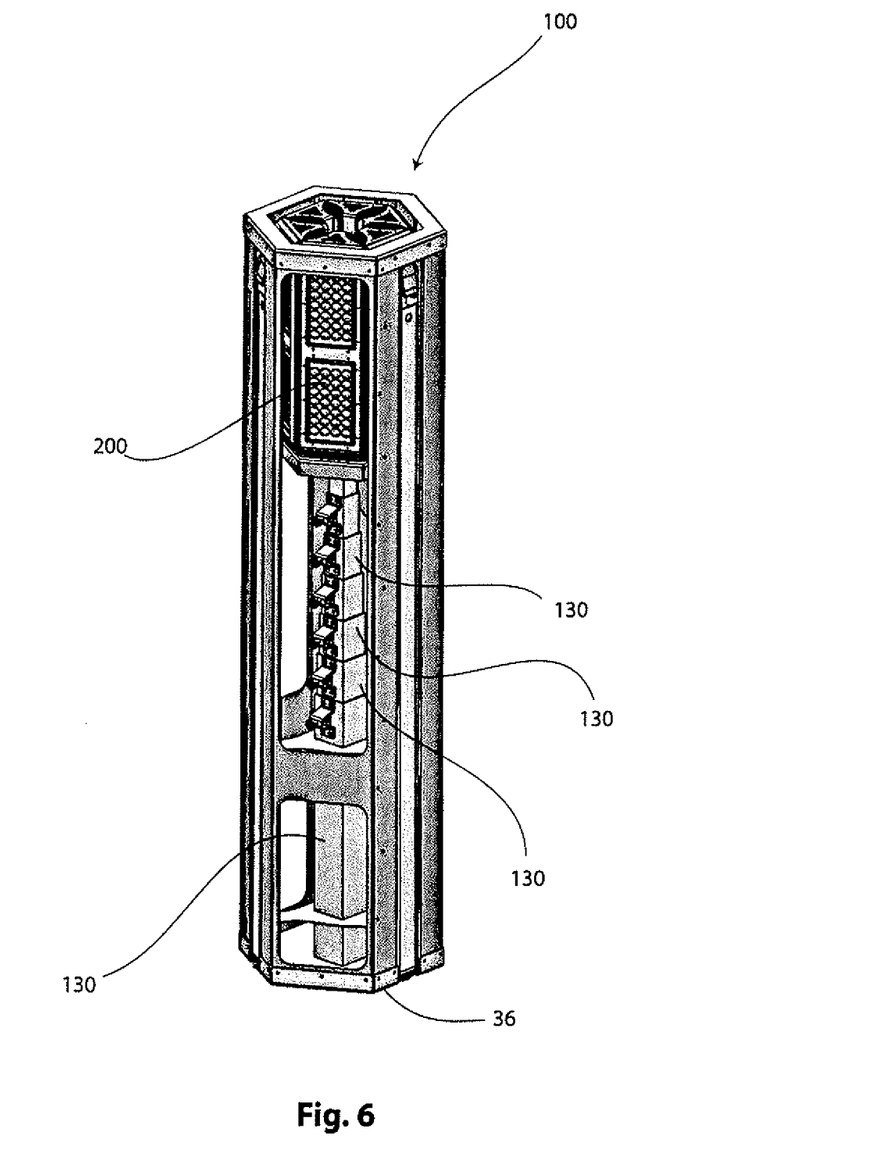
FIG. 6 shows a perspective view of a transportation box according to the first aspect of the present invention comprising technical equipment arranged on a telescopic pole in its collapsed state.

FIG. 6 shows a transportation box 100 comprising the unfolding device 136 of FIG. 5a-5c in a fully collapsed state in the sense that the expandable legs are in a collapsed state and in the sense that the telescopic pole is in a collapsed state.

Figure 7:
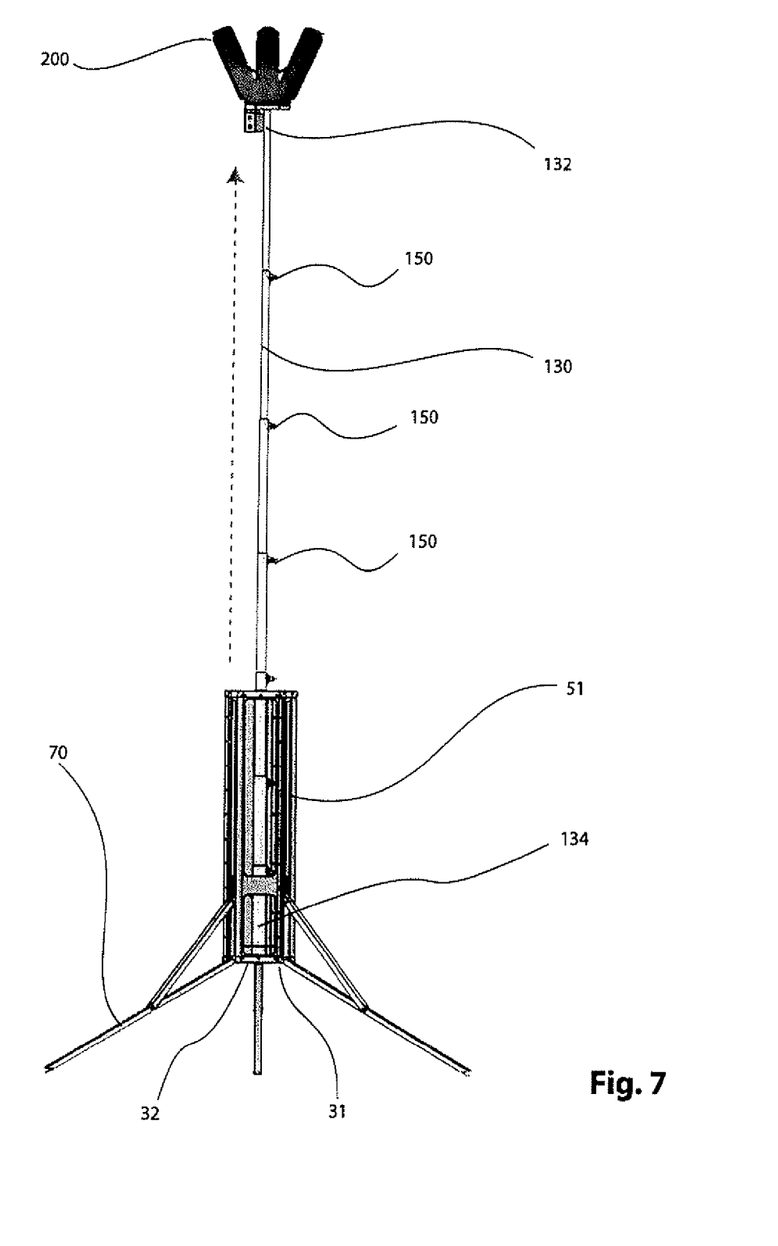
FIG. 7 shows a perspective view of a transportation box according to the first aspect of the present invention comprising technical equipment arranged on a telescopic pole in a state ready for use.

FIG. 7 shows the transportation box 100 of FIG. 6 in its fully expandable state in the sense that the expandable legs are in an expanded state and in the sense that the telescopic pole is in an expanded state. FIG. 7 also shows locking means 150 for locking the telescopic pole.

List of reference numerals

| | |
|---|---|
| 1, 2, 3, 4, 5, 6 | Vertices of first end frame |
| 8 | First end frame |
| 11, 12, 13, 14, 15, 16 | Edges of first end frame |
| 18 | Second end frame |
| 21, 22, 23, 24, 25, 26 | Vertices of second end frame |
| 31, 32, 33, 34, 35, 36 | Edges of second end frame |
| 41, 42, 43, 44, 45, 46 | Corner elements |
| 51, 53, 55 | Longitudinal side sections being leg sections |
| 52, 54, 56 | Longitudinal side sections not being leg sections |
| 60 | Leg assembly |
| 70 | Extendable leg |
| 72 | Support strut of leg assembly |
| 74 | First end of support strut |
| 76 | Second end of support strut |
| 100 | Transportation box |
| 110 | Locking means for locking legs in expanded state |
| 112 | Locking element of locking means 110 |
| 114 | First end of locking element |
| 116 | Second end of locking element |
| 118 | Locking plate |
| 120 | Safety pin |
| 130 | Telescopic pole |
| 132 | First end of telescopic pole |
| 134 | Second end of telescopic pole |
| 136 | Unfolding device |
| 138 | Support plate of telescopic pole |
| 140 | Rod of unfolding device |
| 142 | First end of rod of unfolding device |
| 144 | Second end of rod of unfolding device |
| 146 | Hub of unfolding device |
| 148 | Girder of unfolding device |
| 150 | Locking means for telescopic pole |
| 160 | Lower end of connection of technical equipment |
| 200 | Technical equipment |

The invention claimed is:

1. A transportation box 100 for technical equipment 200, said transportation box in the orientation intended for use comprising:
a first, upper end frame 8, said first end frame having a hexagonal circumference and comprising six vertices 1, 2, 3, 4, 5, 6 and six edges 11, 12, 13, 14, 15, 16;
a second, lower end frame 18, said second end frame having a hexagonal circumference and comprising six vertices 21, 22, 23, 24, 25, 26 and six edges 31, 32, 33, 34, 35, 36;
said first and said second end frames being connected by six longitudinal corner elements 41, 42, 43, 44, 45, 46;
each said corner element extending from one vertex of said first end frame 8 to one vertex of said second end frame 18;
said transportation box thereby comprising six longitudinal side sections 51, 52, 53, 54, 55, 56;
wherein three of said six longitudinal side sections are leg sections 51, 53, 55, each leg section comprising a leg assembly 60;
wherein each leg assembly 60 comprises an extendable leg 70 being adapted to be able to switch between a collapsed state, in which the leg is accommodated in said corresponding leg section 51, 53, 55; and an extended state, in which said leg is extending outward from said leg section 51, 53, 55 to provide support for said transportation box when arranged in an upright position;
wherein each said leg assembly 60 comprises locking means 110 for releasable locking its corresponding leg in its extended state;
wherein any two of said three leg sections 51, 53, 55 are arranged on either side of a side section which is not a leg section 52, 54, 56.

2. A transportation box 100 according to claim 1, wherein each said leg assembly comprises locking means 64 for releasable locking said leg in its collapsed state.

3. A transportation box according to claim 1, wherein each said leg assembly comprises:
said leg 70, being at its one end pivotally attached to the leg section 51, 53, 55 corresponding to said leg assembly at a position proximate to said second end frame 18; and
a support strut 72 having a first end 74 being pivotally attached to said leg 70; and a second end 76 being slidable attached to the leg section 51, 53, 55.

4. A transportation box according to claim 3, wherein said locking means 110 comprises:
a locking element 112 having a first end 114 and a second end 116;
a locking plate 118 being arranged at said leg section 51, 53, 55 and being adapted to engage with said first end 114 of said locking element 112 so as to form a locking of said leg 70;
said locking element 112 being pivotally mounted on said second end 76 of said support strut 72 at a position between said first end 114 and said second end 116 of said locking element 112; and
a locking pin configured to be switched between a locking position in which said locking pin prevents un-engagement of said locking element 112 with said locking plate 118 by engaging said locking pin with said second end 116 of said locking element 112; and an unlocking position in which said locking pin allows un-engagement of said locking element 112 with said locking plate 118.

5. A transportation box according to claim 4, wherein said locking pin 120 is spring loaded so as to hold it in place in its locking position or in its unlocking position.

6. A transportation box according to claim 1, wherein in respect of each leg assembly 60, the angle between said corresponding side section 51, 52, 53, 54, 55, 56 and said leg 70 in its expanded and locked state is 90-175°.

7. A transportation box according to claim 1, wherein said transportation box is configured to accommodate technical equipment 200.

8. A transportation box according to claim 7, wherein said technical equipment is selected from the group consisting of lighting means; loudspeakers; means for receiving or transmission of electromagnetic radiation; water purification devices; electrical generators: solar cells; and a fuel cell stack.

9. A transportation box according to claim 7, further comprising means 90 for supplying electrical energy to said technical equipment.

10. A transportation box according claim 9, wherein said means 90 for supplying electrical energy is selected from the group consisting of a battery, an accumulator, a generator coupled to an internal combustion engine, and a fuel cell stack.

11. A transportation box according to claim 7, wherein said transportation box comprises a telescopic pole 130 having a first end 132 configured to be connected to said technical equipment; and a second end 134 attached to said second end frame 18, thereby allowing raising the position of said technical equipment.

12. A transportation box according to claim 11, wherein said transportation box comprises two or more items of technical equipment and further comprises an unfolding device 136 for folding out said two or more items of technical equipment; wherein:

said first end 132 of said telescopic pole is connected to a support plate 138 for supporting said two or more items of technical equipment;

said unfolding device 136 comprises a rod 140 having a first end 142 and a second end 144;

said first end 142 of said rod 140 is connected to said support plate 138;

wherein a hub 146 is slideably attached to said rod 140;

said hub in respect of each of said two or more items of technical equipment comprises a pivotally connected girder 148;

wherein each of said two or more items of technical equipment is pivotally connected at a lower end 160 to said support plate 138 of said first end 132 of said telescopic pole 130; and is pivotally connected to said girder 148 at a higher position of said technical equipment 200.

13. A transportation box according to claim 12 wherein said transportation box comprises locking means 150 for locking said telescopic pole in a desired position.

14. A transportation box according to claim 1, wherein said transportation box has a longitudinal dimension from said first end frame 8 to said second end frame 18 of 90-155 cm.

15. A transportation box according to claim 1, wherein said transportation box having a transverse dimension from one vertex 1, 2, 3 or 11, 12, 13 of said end frame 8, 18 to the oppositely arranged vertex 4, 5, 6 or 14, 15, 16 of said end frame 8, 18 of 25-40 cm.

16. A transportation box according to claim 11, wherein said technical equipment comprises two or more substantially identical items of technical equipment.

\* \* \* \* \*